April 8, 1930.    L. D. KAY    1,753,608
MOLDING APPARATUS
Filed Jan. 30, 1928
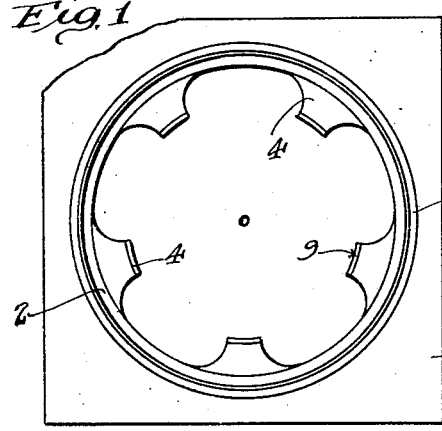
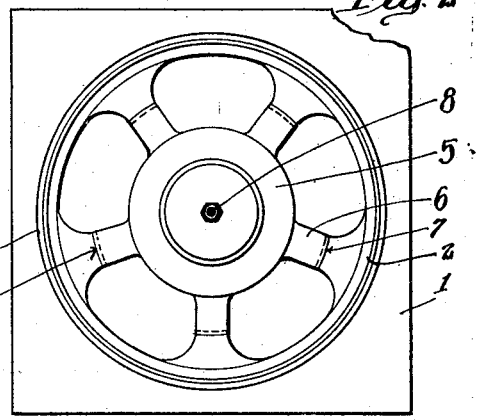
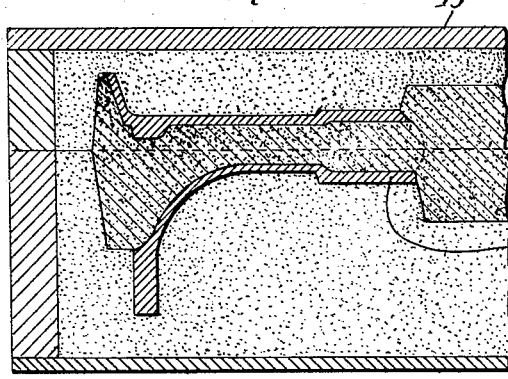
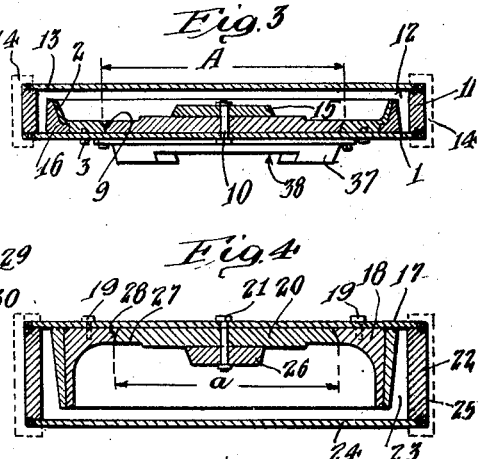
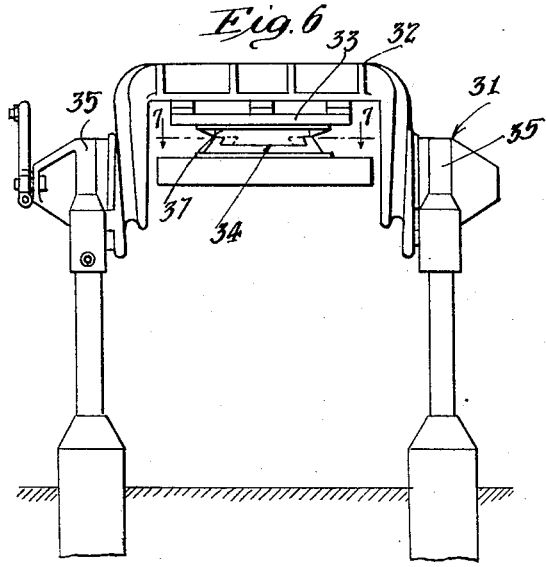
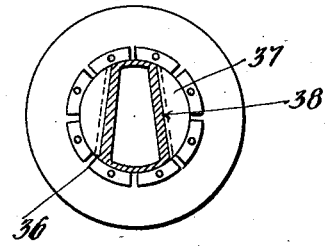
Inventor
Lloyd D. Kay
By Lyon & Lyon
Attorneys Patented Apr. 8, 1930

1,753,608

UNITED STATES PATENT OFFICE

LLOYD D. KAY, OF LOS ANGELES, CALIFORNIA

MOLDING APPARATUS

Application filed January 30, 1928. Serial No. 250,602.

This invention relates to molding apparatus and the invention is applicable in connection with the equipment used for molding wheels. Cast steel wheels for automobile trucks have become very popular. The hubs of these cast wheels must of course conform to the axle design of the particular automobile trucks for which they are intended, but the rims of these wheels may be of a few different types for all trucks. In other words it is frequently desirable to use the same type of rim with different types of hubs.

The general object of this invention is to provide a pattern of simple construction which can be readily modified to enable the central portion of the pattern to be changed as desired to produce wheels with different types of hubs.

These wheels may be very conveniently molded with molding machines and in the type of molding machine employed for this purpose the cope of the mold is mounted on the inverting yoke of the molding machine. One of the objects of the invention is to provide a simple connection for securing the cope to this inverting yoke which will enable the copes of the flasks to be quickly secured in place without necessitating the removal of any bolts and at the same time to provide a connection which will maintain itself intact when the inverted yoke is turned over.

The invention contemplates the use of a face plate corresponding to each part of the flask, that is to say, there is a face plate corresponding to the drag and another face plate corresponding to the cope. These plates constitute the bottom of the drag or cope when it is being rammed. After being rammed, the drag or cope is turned over and the plate carrying the pattern is drawn from the mold. The parting line for the complete mold is on the middle plane of the spokes so that when the drag and the cope are put together, the complete mold is formed. Each plate carries permanently its corresponding portion of the rim of the wheel. According to my invention the hub or central portion of the pattern is removably attached to the plate. By changing this central portion the design of the hub of the finished wheel can be altered as desired. This, of course, entails the use of a removable center for each pattern section. One of the objects of my invention is to construct the pattern in such a way as to prevent any possibility of the center sections of the patterns being substituted for each other and wrongly placed, that is to say, my object is to provide a construction which will insure that the hub pattern corresponding to one side of the wheel will be placed on the proper side of the wheel.

Further objects of the invention will appear hereinafter.

The invention consists in the novel parts and combination of parts to be described hereinafter, all of which contribute to produce an efficient molding apparatus.

In the drawing Figure 1 is a plan showing the pattern for the rim of a wheel secured to its face plate but with the central portion of the pattern removed. In this view a corner of the plate is broken away.

Figure 2 is a view similar to Figure 1 but showing the complete pattern corresponding to this plate. In other words this view shows the rim of the pattern and also shows the central portion of the pattern set centrally in the rim.

Figure 3 is a vertical section through a cope and passing through the center of the face plate. This is an ideal section that is to say, it shows two of the radial portions of the pattern as though they were diametrically opposite to each other.

Figure 4 is a view similar to Figure 3 but showing a section through the other face plate which carries the other half of the pattern and this view shows the drag of the flask in the position it has when the pattern is about to be drawn.

Figure 5 is a vertical section through a portion of the mold which may be formed by practicing my invention.

Figure 6 is a diagrammatical side elevation illustrating the inverting yoke of a molding machine and particularly illustrating the construction of the connection which I employ for attaching a flask section to it.

Figure 7 is a sectional plan taken about on the line 7—7 of Figure 6 and further illustrating the connection which I employ for connecting a section of the flask to the inverting yoke of the molding machine.

In practicing the invention I provide a face plate 1 of square form in the present instance. On the face of this plate I attach a rim pattern 2 which is permanently secured by means of bolts 3 such as illustrated in Figure 3. This rim pattern 2 may have short radial extensions 4 which correspond to the spokes of the finished wheel. In Figure 2 I show the complete pattern corresponding to this plate. In order to complete the pattern I attach a pattern center or hub portion 5 which has radial extensions 6 corresponding to the extensions 4 on the rim. These extensions 4 and 6 meet together at points 7 located at a given radius from the center 8 of the plate. At these points 7 the two meeting extensions 4 and 6 preferably have inclined faces as indicated at 9 in Figure 3.

The central portion 5 is removably attached to the plate by means of a through bolt 10 located at the center of the plate 1.

In forming the mold the plate 1 forms the bottom of the cope 11 which is rammed with sand in the space 12 after which a cover 13 is applied and temporarily held with clamps 14. The cope is then turned over and the plate 1 with the pattern attached to it is drawn. The pattern is formed with a core print 15 at the center and with an annular core print 16 around its rim.

Referring to Figure 4, I provide another face plate 17 similar to the face plate 1 to which I permanently attach a rim pattern 18 by means of suitable bolts 19. This pattern is provided with a removable center pattern or section 20 similar to the hub portion 5 already described. The center portion 20 and the rim 18 have radial extensions like radial extensions 4 and 6 which cooperate to form a complete pattern for one-half of each spoke. The center portion 20 is held in place removably by removable bolt 21 located at the center of plate 17. In forming the mold in this half of the pattern, the procedure is similar to that described in connection with the other half, that is to say the plate 17 is used to form the bottom of the drag 22, the space 23 within the drag being rammed with sand. A cover 24 is then applied together with clamps 25 and the drag is then inverted into the position in which it is shown in Figure 4. The clamps are then removed and the pattern is drawn. The central portion of the pattern center 20 is provided with a core print 26 and any other necessary core prints are carried on the rim 18.

The radial extensions 27 of the center section 20 unite by inclined joints 28 to the corresponding extensions of the rim section 18. I construct the pattern in any suitable manner so that the hub portion 5 will not match up with the rim portion 18, and so that the hub portion 20 will not match up with the rim pattern 2. For this purpose the joints 28 are all at the same radius from the axis of the center bolt 21. The dimension A as indicated in Figure 3 is different from the dimension a as indicated in Figure 4. In other words the joints 9 are at a different radius from the center of the pattern than the joints 28. By reason of this it becomes impossible for the molders to accidentally substitute a hub portion for one side of the wheel for the hub portion that should go at the other side of the wheel, that is to say, the pattern sections can only be put together with the proper sections matching each other. This prevents any possibility of the wheels being cast with the hubs in a reversed and wrong position.

After the drag and cope have been prepared as described and the patterns withdrawn, then the proper core such as the core 29 is formed and placed in position between the drag and the cope as indicated in Figure 5. In this view 30 indicates the cast wheel lying in the mold.

When the molding is to be done in a molding machine 31 such as indicated in Figure 6, I provide an improvement for facilitating the attachment of one of the parts of the flask, for example the cope, to the inverting yoke 32 of the machine. For this purpose I provide the inverting yoke with a specially constructed fitting 33 which is attached to the body of the inverting arm, and the under side of this fitting as illustrated in Figure 6 is provided with a tapered tongue 34. The inverting yoke 32 is mounted to rotate on a horizontal axis passing through bearings 35 and the wide end 36 of the tongue (see Figure 7) is located on the side toward which the inverting yoke swings when bringing the cope down to its lowest position. The plate 1 of the cope is provided with a fitting 37 which has a dovetail groove 38 in it and this dovetailed groove fits the dovetailed tongue 36. In other words, the dovetailed tongue operates as a wedge in the dovetailed groove, and the cope can be attached to the inverting arm simply by sliding it onto the arm with the tongue 34 in the groove 38. When the inverting arm 32 is rotated down from the position in which it is shown in Figure 6, the direction of rotation will be from above downwardly as viewed in Figure 7, that is, toward the observer as viewed in Figure 6. Hence the cope will not dislodge itself due to its own weight but its weight will tend to tighten it on the tongue 34. In other words, I provide an interlocking connection between the fitting 33 and the cope that is tapered in a direction to prevent the cope from falling off when the yoke 32 is rotated down from the elevated position in which it is shown in Figure 6, that is to say, the yoke 32 should move toward the observer in Figure 6.

It is understood that the embodiment of the invention described herein is only one of the many embodiments this invention may take, and I do not wish to be limited in the practice of the invention, nor in the claims, to the particular embodiment set forth.

What I claim is:—

1. In molding apparatus for molding wheels or the like in a flask, a pattern having a plate in combination with an annular pattern member corresponding to the rim of the wheel permanently attached to the side of the plate, and a central pattern member removably attached to the plate corresponding to the central part of the wheel and matching with the annular pattern member to form joints on radial lines to form a complete pattern for the drag of the mold, a second pattern having a plate in combination with a second annular pattern member corresponding to the rim of the wheel permanently attached to the side of the second named plate, and a second central pattern member removably attached to the second named plate corresponding to the central part of the wheel and matching with the second named annular pattern member to form joints located on radial lines from the center of the pattern to form a complete pattern for the cope of the mold, said first named central pattern member and said second named rim member being constructed so that they will not match together to form joints of the pattern, and said second named central pattern member and said first named annular pattern member being constructed so that they will not match together to form joints of the pattern.

2. In molding apparatus for molding wheels or the like in a flask, a pattern having a plate in combination with an annular pattern member corresponding to the rim of the wheel permanently attached to the side of the plate, and a central pattern member removably attached to the plate corresponding to the central part of the wheel and matching with the annular pattern member at points on a given radius to form a complete pattern for the drag of the mold, a second pattern having a plate in combination with an annular pattern member, corresponding to the rim of the wheel, permanently attached to the side of the second named plate, and a central pattern member removably attached to the second named plate corresponding to the central part of the wheel and matching with the second named annular pattern member at points located at a different radius than the first named radius from the center of the pattern to form a complete pattern for the cope of the mold.

3. In molding apparatus for molding a wheel or the like in a flask, a pattern having a plate in combination with an annular pattern member permanently attached to it and corresponding to the rim of the wheel, and including radial portions corresponding to the spokes of the wheel, and a central pattern member corresponding to the central part of the wheel, a single central bolt located on the central axis of the pattern member attaching the same to the said plate, said central pattern member having radial portions corresponding to the spokes of the wheel and matching with the corresponding radial portions of the annular pattern at points located on a radius from the center of the annular pattern member, said pattern members cooperating to form a complete pattern for the drag or cope of the mold.

4. In molding apparatus, the combination of a molding machine having an inverting yoke for supporting and inverting a cope or drag, and mounted for rotation on a substantially horizontal axis, a drag or cope of a flask adapted to be attached to the said yoke, said yoke and the side of said flask having an interlocking tongue and groove connection tapered so that the wide end of the taper is disposed on the side of the yoke towards which the same revolves on its axis of rotation, whereby said interlocking connection is maintained in the upright position while inverting the said yoke.

Signed at Los Angeles, Calif., this 17th day of January, 1928.

LLOYD D. KAY.